Feb. 11, 1941. J. L. HUSTON 2,231,270
SNAP-ON CORK
Filed May 19, 1939
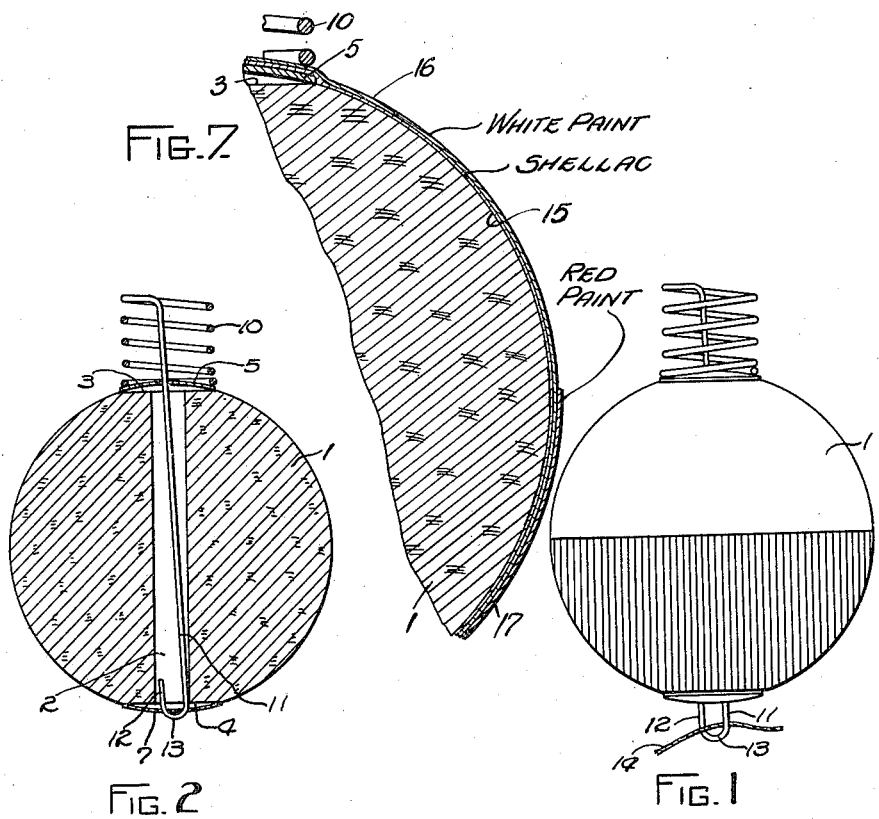
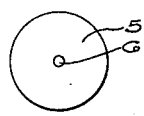
Fig. 6
Fig. 5
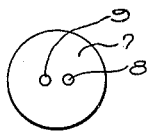
Fig. 4
Fig. 3
INVENTOR.
James L. Huston
BY John D. McLean
ATTORNEY.

Patented Feb. 11, 1941

2,231,270

UNITED STATES PATENT OFFICE 2,231,270

SNAP-ON CORK

James L. Huston, Arcanum, Ohio

Application May 19, 1939, Serial No. 274,609

9 Claims. (Cl. 43—49)

My invention relates to improvements in fishing corks, and has for its object to provide a cork which may be attached to a fishing line so that it may slide along the line or be fixed at any point on the line. It is also an object of my invention to provide a fishing cork having thereon a line engaging instrumentality which may either clamp the line, or engage the line so that the cork may readily slide along the line.

It is also an object of my invention to provide a fishing cork having thereon an adjustable mounted hook for engaging a fishing line, so that it may clamp the line or engage the line so that the cork may freely move thereon.

I attain these objects by means of a cork illustrated in the accompanying drawing, in which Figure 1 is a side elevation of my cork with the line engaging members in a position to permit the cork to slide along the line.

Figure 2 is a section through the cork showing the line engaging members in position to clamp the line.

Figure 3 is a view showing one edge of a concavo-convex disk forming part of the fishing cork.

Figure 4 is a view of the disk shown in Figure 3 taken from the right-hand side thereof.

Figure 5 is an edge view of another concavo-convex disk forming part of the fishing cork.

Figure 6 is a view of the disk shown in Figure 5 taken from the right-hand side thereof.

Fig. 7 is an enlarged fragmentary sectional view, taken on the same plane as Fig. 1, and showing the coatings of shellac and enamels.

The fishing cork consists essentially of a spherical piece of cork 1, which may be of any suitable diameter but is preferably about 1¼ inches in diameter and has extending diametrically there-through a hole 2, which is about ⅛ of an inch in diameter. The sphere 1 at one end of the hole 2 is flattened, as indicated by the numeral 3, and adjacent the other end of the hole 2 is flattened as indicated by the numeral 4. On the flat part 3 of the sphere is a concavo-convex disk 5 made of brass or any other suitable material. This disk is about .005 of an inch in thickness and has in the center thereof a hole 6 which is about .04 of an inch in diameter. On the flat surface 4 of the sphere is a concavo-convex brass plate in the shape of a disk 7 which is about .04 of an inch in thickness and has adjacent its center two holes, 8 and 9.

In engagement with the convex surface of the disk 5 is a coil spring 10, which has its outer part formed into a disk engaging stem 11 which extends through the spring and through the hole 2 of the cork sphere 1. The free end of the stem 11 is bent so as to form a prong 12, substantially parallel with the stem 11. The connection between the stem and the prong forms an arcuate part 13 of a hook. The stem 11 passes through the hole 8 and may freely move therein by pressing on the outer end of the spring 10. The prong 12 may either fit in the hole 9, or it may be made to engage the outer surface of the disk 7.

The cork is attached to the line 14 by means of the hook formed on the free end of the stem. This line passes between the stem 11 and the prong 12 and may be clamped by the actions of the spring against the disk 7 by means of the arcuate part 13 when the prong 12 is located in the hole 9. In this position the cork is firmly attached to the line at the fixed and definite point. In order that the cork may slide easily along the line the spring is pressed and the stem rotated so that the end of the prong 12 will engage the outer surface of the disk 7 so that the arcuate part of the hook does not clamp the line against the surface of the disk 7.

The spring and the stem, which is a continuation of the spring, are made of stainless steel and will not rust. The disks are made of brass or any other suitable material. The diameter of the wire which forms the spring and the stem is of such dimension that the stem and prong will freely slide in the holes in the disks. The surfaces of the disk and the hook are smooth so that the cork may be easily moved along the line.

This cork is adapted to be applied to a fish line for casting or for still fishing. In casting it may be desirable that the cork move freely along the line, and for that purpose the prong is caused to engage the outer surface of the disk 7 away from the hole 9. When it is desired that the cork be attached to the line at some definite point, the prong 12 is caused to fit in the hole 9 so that the line is clamped between the disk 7 and the arcuate part 13 on the hook at the end of the stem 11.

The cork ball is first covered with a coating 15 of shellac, which serves as an adhesive for holding the disks in place. The ball is then covered with a coating 16 of white enamel, after which the lower half of the ball is covered with a coating 17 of red enamel.

The cork 1 is spherical and for that reason will float upon water in any position when not influenced by other elements such as the spring 10 and a sinker attached to the hook at the end of the stem 11. Under the influence of spring 10 alone, the cork will rest upon water with the red part of the cork or float exposed, with the spring 10 on the underside of the cork and submerged in the water. If a sinker be attached to the hook on the end of the stem 11 and the sinker and cork be thrown into water the cork will be maintained in such a position that the spring 10 is out of the water if the sinker is not supported on the ground under the water. But, if the sinker rests upon the ground under the water, the cork will rotate so that the red part of the cork is exposed to view through the action of the spring 10 serving as a weight to overbalance the cork or sinker. By this means the fisherman is able to determine whether the sinker is supported by the cork or is resting on the ground beneath the water.

What I claim is:

1. In a float for a fishing line, a body member, a disc on the body member, a spring on said body member, and a clamp member operated by the spring and co-operating with the disc to clamp the line whereby the float is attached to the line.

2. In a float for a fishing line, a body member having therein a hole, a disc at one end of the hole, a clamp member co-operating with the disc for clamping the line, a spring at the other end of said hole, and a connection between the clamp member and the spring, said connection extending through the hole.

3. In a float for a fishing line, a body member having a hole therein, a disc over one end of the hole, a coil spring engaging at one end the body member around the other end of the hole, a clamp member adjustable with relation to the disc and cooperating with the disc to clamp the line or to hold the float slidably on the line, and a member extending through the hole connecting the other end of the spring to the clamp member for operating the clamp member.

4. In a float for a fishing line, a body member having therein a hole, a disk at each end of the hole, one disk having therein a single hole and the other disks having therein a pair of holes, a coil spring engaging at one end the disk having a single hole therein, a stem extending from the other end of the spring, said stem extending through a hole of each disk, and a hook on the stem, said hook having a prong adapted to extend through the other hole of the disk having two holes therein.

5. In a float for a fishing line, a body member having adjacent thereto a plate of hard material, said plate having a pair of holes therein, and means located in one hole and adapted to be inserted into the other hole for co-operating with said plate to clamp the line.

6. In a float for a fishing line, a body member having adjacent thereto a plate of hard material, said plate having therein a pair of holes, and means extending through one hole and adapted to be inserted into the other hole and co-operating with the plate to hold the float fixed at any point on the line, said means being adapted to engage said plate away from said other hole whereby said means in cooperation with the plate holds the float on the line so that the float may freely move along the line.

7. In a float for a fishing line, a body member having a hole therein, a plate of hard material over said hole, said plate having a pair of holes therein, means in said pair of holes and co-operating with the plate to clamp the line, and means in said first named hole operating on said first named means to cause the line to be clamped.

8. In a float for a fishing line, a body member, a plate adjacent said body member, said plate having a hole therein, a clamp member supported by said body member, said clamp member comprising a stem extending into the body member and adapted to rotate and move longitudinally with respect to said body member, said clamp member also comprising a prong adapted to fit into said hole whereby the clamp member will clamp the line and hold the float in fixed position on the line, or engage the plate to provide a loop for the line whereby the float is held on the line for free movement thereon.

9. In a float for a fishing line, a body formed of a spherical piece of cork, one part of said cork being colored in one color and an opposite part of said cork being colored in another color, a weight member on said cork adjacent one color and a clamp member on said cork adjacent the other color to engage a fishing line having a sinker thereon, the weight and the sinker acting on opposite sides of the cork to expose to view different colors on the cork when the cork is on water and depending upon whether the sinker is supported by the cork or is resting upon the ground under the water.

JAMES L. HUSTON.